United States Patent
Chen et al.

(10) Patent No.: US 11,289,762 B2
(45) Date of Patent: Mar. 29, 2022

(54) BATTERY PACK

(71) Applicant: Contemporary Amperex Technology Co., Limited, Fujian (CN)

(72) Inventors: Xingdi Chen, Zhangwan Town (CN); Kaijie You, Zhangwan Town (CN); Linggang Zhou, Zhangwan Town (CN); Peng Wang, Zhangwan Town (CN); Yanhuo Xiang, Zhangwan Town (CN); Ning Chen, Zhangwan Town (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 195 days.

(21) Appl. No.: 16/570,257

(22) Filed: Sep. 13, 2019

(65) Prior Publication Data
US 2020/0212388 A1    Jul. 2, 2020

(30) Foreign Application Priority Data
Dec. 30, 2018    (CN) .......................... 201811648926.6

(51) Int. Cl.
*H01M 50/20*    (2021.01)
(52) U.S. Cl.
CPC ........ *H01M 50/20* (2021.01); *H01M 2220/20* (2013.01)
(58) Field of Classification Search
None
See application file for complete search history.

(56) References Cited

U.S. PATENT DOCUMENTS

| | | |
|---|---|---|
| 2005/0164080 A1 | 7/2005 | Kozu et al. |
| 2014/0057137 A1 | 2/2014 | Lee |
| 2014/0227586 A1 | 8/2014 | Byun et al. |
| 2016/0020494 A1* | 1/2016 | Kamizori ................. H02J 7/00 429/7 |
| 2016/0218388 A1 | 7/2016 | Kim et al. |

FOREIGN PATENT DOCUMENTS

| | | |
|---|---|---|
| CN | 103985830 A | 8/2014 |
| CN | 206022547 U | 3/2017 |
| CN | 107425153 A | 12/2017 |
| CN | 209249528 U | 8/2019 |
| JP | H1125939 A | 1/1999 |

OTHER PUBLICATIONS

European Search Report issued in Application No. 19175834.1 dated Dec. 12, 2019.
PCT International Application No. PCT/CN2019/125881, International Search Report of the International Searching Authority, dated Mar. 20, 2020, 5 pages.
PCT International Application No. PCT/CN2019/125881, Written Opinion of the International Searching Authority, dated Mar. 20, 2020, 4 pages.

* cited by examiner

*Primary Examiner* — Wyatt P McConnell
(74) *Attorney, Agent, or Firm* — DLA Piper LLP US

(57) ABSTRACT

The disclosure relates to a battery pack, which can include an enclosure including an upper cover and a lower case in sealed connection, a plurality of battery modules is arranged in the enclosure, and a first bonding member disposed on the upper surface of the battery modules and intended for connecting the battery modules with the upper cover. The present disclosure can strengthen the connection strength between the upper cover and the battery modules, and improve the overall stiffness of the battery modules.

10 Claims, 10 Drawing Sheets

BATTERY PACK

PRIORITY

This application claims priority to C.N. Application No. CN201811648926.6 filed on Dec. 30, 2018, which is incorporated by reference herein.

FIELD

This disclosure generally relates to the field of batteries, and more particularly, to a battery pack.

BACKGROUND

A battery pack generally includes an enclosure and a plurality of battery modules. The enclosure includes an upper cover and a lower case, and each of the battery modules includes a plurality of battery cells and a plurality of busbars electrically connected with the plurality of battery cells. In a conventional design, a battery pack is assembled by fixing the battery modules in the lower case with bolts, and then covered by the upper cover. However, the upper cover is not directly connected to the battery modules, the upper cover and the battery modules are separated from each other, the overall stiffness of the battery modules is low, and the plurality of busbars of the battery modules are more prone to break in a vibration test, resulting in short circuiting of the battery modules, and subsequently causing a fire or explosion of the battery pack. Therefore, a battery pack with an improved design is needed to provide a better performance in a vibration test.

SUMMARY

Disclosed herein is a battery pack, which can include an enclosure made of an upper cover and a lower case, a plurality of battery modules disposed inside the enclosure, and a first bonding member disposed on an upper surface of the battery modules connecting the battery modules with the upper cover. The upper cover of the enclosure can be located above the lower case and in sealed connection with the lower case.

In some embodiments, each of the battery modules can include a battery cell array, the battery cell array can include a plurality of battery cells arranged along a horizontal direction and a plurality of busbars electrically connected with the plurality of battery cells. Each of the battery cells can include a cell case and an electrode assembly contained in the cell case. The electrode assembly can include a first electrode plate, a second electrode plate, and a separator disposed between the first and second electrode plates. In some embodiments, the electrode assembly can have a flat wound configuration, in which outer surfaces of the electrode assembly can include two flat sides facing each other along a vertical direction. In some embodiments, the electrode assemble can have a laminated configuration, in which the first electrode plate, the separator and the second electrode plate can be stacked along a vertical direction.

In some embodiments, the cell case can include two first surfaces facing each other along the vertical direction and two second surfaces facing each other along the horizontal direction, and an area of each of the two first surfaces can be larger than an area of each of the two second surfaces.

In some embodiments, the plurality of battery cells can be connected with the upper cover via the first bonding member, and one of the two first surfaces faces the upper cover and can be in a direct contact with the first bonding member. In some embodiments, each of the plurality of battery modules can include two battery cell arrays stacked along the vertical direction.

In some embodiments, each of the plurality of battery modules can include a strap surrounding a periphery of the battery cell array, the strap can include two long sides and two short sides, the two long sides can face the two first surfaces and extend along the horizontal direction, and the two short sides can face the two second surfaces and extend along the vertical direction. In some embodiments, each of the plurality of battery modules can include at least two straps arranged at an interval.

In some embodiments, a first groove can be formed between two adjacent long sides above one of the two first surfaces facing the upper cover, and the first bonding member can be disposed inside the first groove and extends along the horizontal direction.

In some embodiments, a convex portion disposed opposite to the first groove and bonded with the first bonding member can be formed in an inner surface of the upper cover. In some embodiments, the convex portion can extend into the first groove, and a thickness of the first bonding member can be smaller than a thickness of the two adjacent long sides above the one of the two first surfaces facing the upper cover.

In some embodiment, the battery pack can include a second bonding member disposed on a lower surface of one of the plurality of battery modules, and the lower surface of the one of the plurality of battery modules can be connected with the lower case through the second bonding member.

In some embodiments, a second groove can be formed between two adjacent long sides below one of the two first surfaces away from the upper cover, and the second bonding member can be disposed within the second groove and extends along the horizontal direction.

In some embodiments, each of the plurality of battery modules can include two end plates respectively disposed at two ends of the battery cell array along the horizontal direction, the strap can surround a periphery of the battery cell array and the two end plates, and a top surface of each of the two end plates can be provided with a protrusion protruding out of an upper surface of the battery module and located between the two adjacent long sides above the one of the two first surfaces facing the upper cover.

In some embodiments, each of the plurality of battery modules can be provided with two straps, and a plurality of convex portions respectively corresponding to the first groove of each of the plurality of battery modules can be formed in the upper cover.

Also disclosed herein is a method of improving the stiffness of a battery pack, which can include disposing a first bonding member on an upper surface of plurality of battery modules and connecting the battery modules with an upper cover of an enclosure for housing the battery modules. By this design, the battery modules can be connected with the upper cover via the first bonding member to form an integral part, which strengthens the connection strength between the upper cover and the battery modules, and improves the overall stiffness of the battery modules.

Further disclosed herein is a method of manufacturing a battery pack, which can include placing a plurality of battery modules in an enclosure made of an upper cover and an lower case, disposing a first bonding member on an upper surface of the plurality of the battery modules, and connecting the battery modules with the upper cover using the first bonding member.

BRIEF DESCRIPTION OF DRAWINGS

In order to facilitate a full understanding of the present disclosure, reference is now made to the accompanying drawings, in which like elements are referenced with like numerals. These drawings should not be construed as limiting the present disclosure, but are intended to be illustrative only. The drawings are not necessarily to scale, or inclusive of all elements of a system, emphasis instead generally being placed upon illustrating the concepts, structures, and techniques sought to be protected herein.

DESCRIPTION

Figure 1:
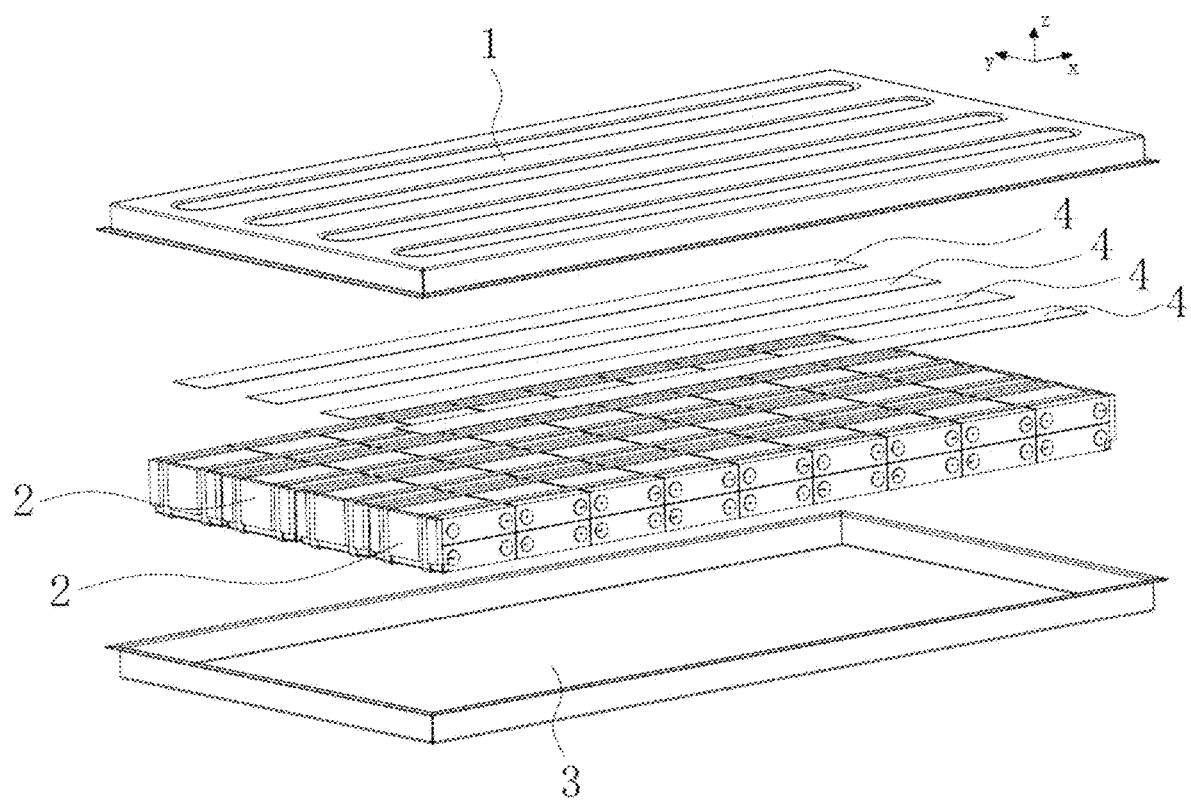
FIG. 1 is an exploded view of a battery pack, according to some embodiments of the present disclosure.

The battery pack according to the present disclosure will be further described in detail with reference to the accompanying drawings.

The elements in the figures are described in the following:
1: upper cover
11: convex portion
2: battery module
20: battery cell array
21: battery cell
211: electrode assembly
2111: first electrode plate
2112: second electrode plate
2113: separator
2114: flat side
212: cell case
2121: first surface
2122: second surface
213: electrode terminal connector
214: cover plate
215: electrode terminal
22: strap
221: long side
222: short side
23: first groove
24: end plate
241: protrusion
242: strap limit slot
25: insulating member
26: busbar
3: lower case
4: first bonding member
5: second bonding member Exemplary embodiments will now be described in detail hereinafter with reference to the accompanying drawings in order to fully explain the technical content, structural features, purposes and effects of the present technical solution.

Unless otherwise expressly stated and defined, the terms "first" and "second" in this application are only used for description, and should not be construed as indicating or implying the relative importance. The term "a plurality of" means two or more. The terms "connection" and "fixation" should be construed in a broad sense. For example, "connection" may be fixed connection, removable connection, integral connection, or electrical connection; also, it may be direct connection or indirect connection through an intermediary. For those skilled in the art, the specific meanings of the above terms in the present application can be understood on a case-by-case basis.

In the present disclosure, the direction indicated by arrow x in all the drawings means the length direction, the direction indicated by arrow y means the width direction, and the direction indicated by arrow z means the vertical direction. The horizontal direction means the direction parallel to the horizontal plane, and may be said length or width direction. In addition, the horizontal direction includes not only the direction absolutely parallel to the horizontal plane but also the direction generally parallel to the horizontal plane according to conventional engineering cognition. The vertical direction means the direction perpendicular to the horizontal plane, and includes not only the direction absolutely perpendicular to the horizontal plane but also the direction generally perpendicular to the horizontal plane according to conventional engineering cognition. Moreover, "upper", "lower", "top", "bottom" and the like described in this application are expressed relative to the vertical direction.

The type of battery in the present disclosure can include, but is not limited to, lithium ion battery, aluminum ion battery, carbon battery, flow battery, lead-acid battery, glass battery, magnesium ion battery, metal air battery, molten salt battery, nickel cadmium battery, nickel hydrogen battery, nickel iron battery, nickel metal hydride battery, nickel zinc battery, organic radical battery, polymer-based battery, fuel cell, lithium sulfur battery, sodium ion battery, sodium sulfur battery, and zinc ion battery. In some embodiments, the battery can be a lithium ion battery.

Unlike the conventional battery pack design, the present disclosure employs a first bonding member which can be disposed on the upper surface of the battery modules and intended for connecting the battery modules with the upper cover. By this design, the battery modules can be connected with the upper cover via the first bonding member to form an integral part, which strengthens the connection strength between the upper cover and the battery modules, and improves the overall stiffness of the battery modules.

FIG. 1 shows a battery pack, according to some embodiments of the present disclosure. The battery pack can include an enclosure formed by an upper cover 1 and a lower case 3 arranged below and in sealed connection with upper cover 1, a plurality of battery modules 2, and a first bonding member 4. The sealed connection between upper cover 1 and lower case 3 can prevent external moisture from entering the inside of the battery pack to cause a short circuit. The battery pack can be mounted directly on the vehicle as a power source. The plurality of battery modules 2 can be disposed in the enclosure, and first bonding member 4 can be disposed on upper surface of the battery modules 2 which can be connected to upper cover 1 through first bonding member 4.

First bonding member 4 can be a liquid, paste or solid adhesive such as double-sided tape, glue or the like. In some embodiments, first bonding member 4 can be a type of structural adhesive, which can be liquid or pasty before solidification. The structural adhesive can be applied between battery modules 2 and upper cover 1 and then solidifies, firmly bonding battery modules 2 onto upper cover 1.

Battery modules 2 can be connected with upper cover 1 via first bonding member 4 to enable an integral part formation, which strengthens the connection strength between upper cover 1 and battery modules 2, thereby improving the overall stiffness of battery modules 2 and preventing the battery pack from catching a fire or exploding in a vibration test.

Figure 2:
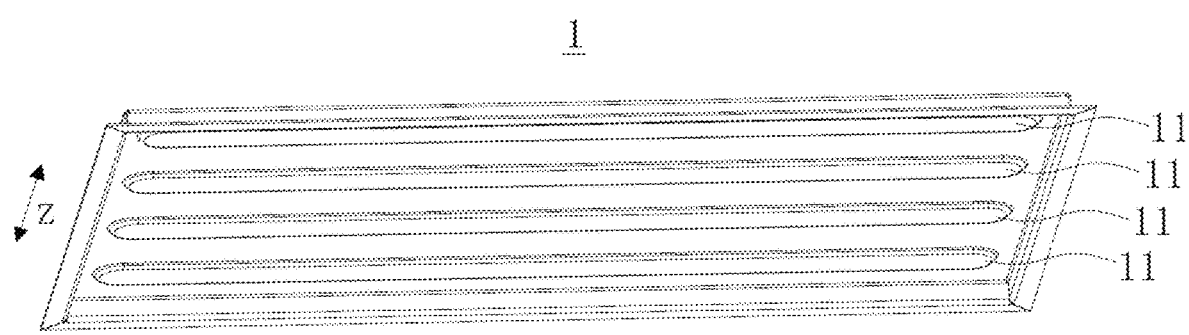
FIG. 2 is a structural view of a upper cover, according to some embodiments of the present disclosure.

FIG. 2 shows the upper cover 1 viewed from the bottom along the vertical direction (the direction indicated by arrow z), according to some embodiments of the present disclosure. A plurality of convex portions 11 can be formed in the inner surface of upper cover 1, and can be arranged corresponding to the plurality of first bonding members 4, so as to establish a connection therebetween.

Figure 3:
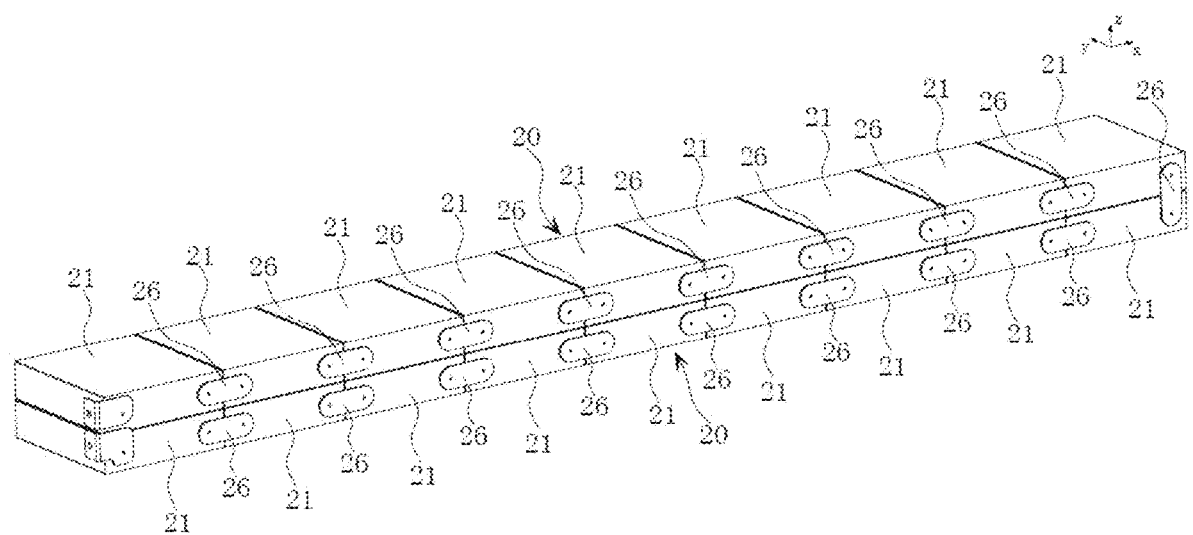
FIG. 3 a structural view of a battery module after the busbars are electrically connected with the battery cells, according to some embodiments of the present disclosure.
Figure 4:
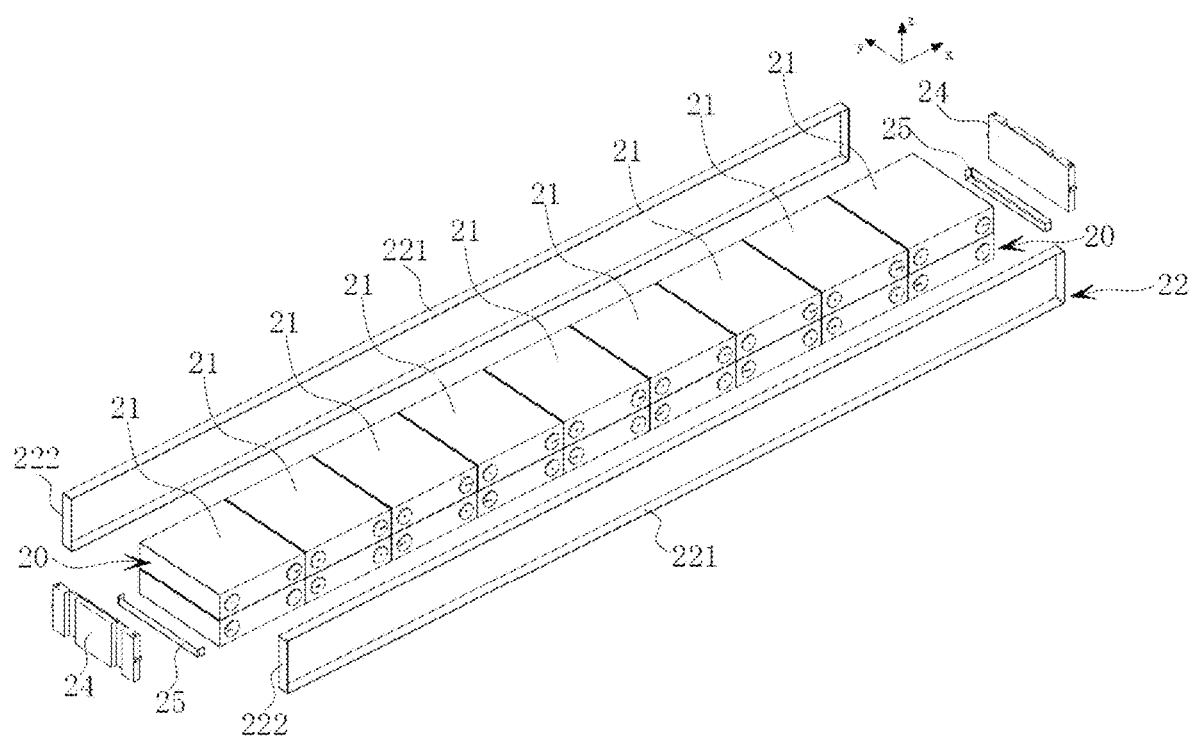
FIG. 4 is an exploded view of the battery modules, according to some embodiments of the present disclosure.

As shown in FIGS. 3 and 4, the battery module 2 can include a battery cell array 20, which can include a plurality of battery cells 21 arranged along a horizontal direction (e.g., the length direction indicated by arrow x), and a plurality of busbars 26 electrically connected with battery cells 21.

In some embodiments, battery module 2 can include at least two battery cell arrays 20, which can be stacked along a vertical direction (the direction indicated by arrow z). When battery module 2 are provided with more than two battery cell arrays 20, the adjacent battery cell arrays 20 can be be fixed with structural adhesive, with the uppermost layer of battery cell arrays 20 fixed onto upper cover 1 with the structural adhesive. In some embodiments, there can be only one battery cell array 20.

Figure 5:
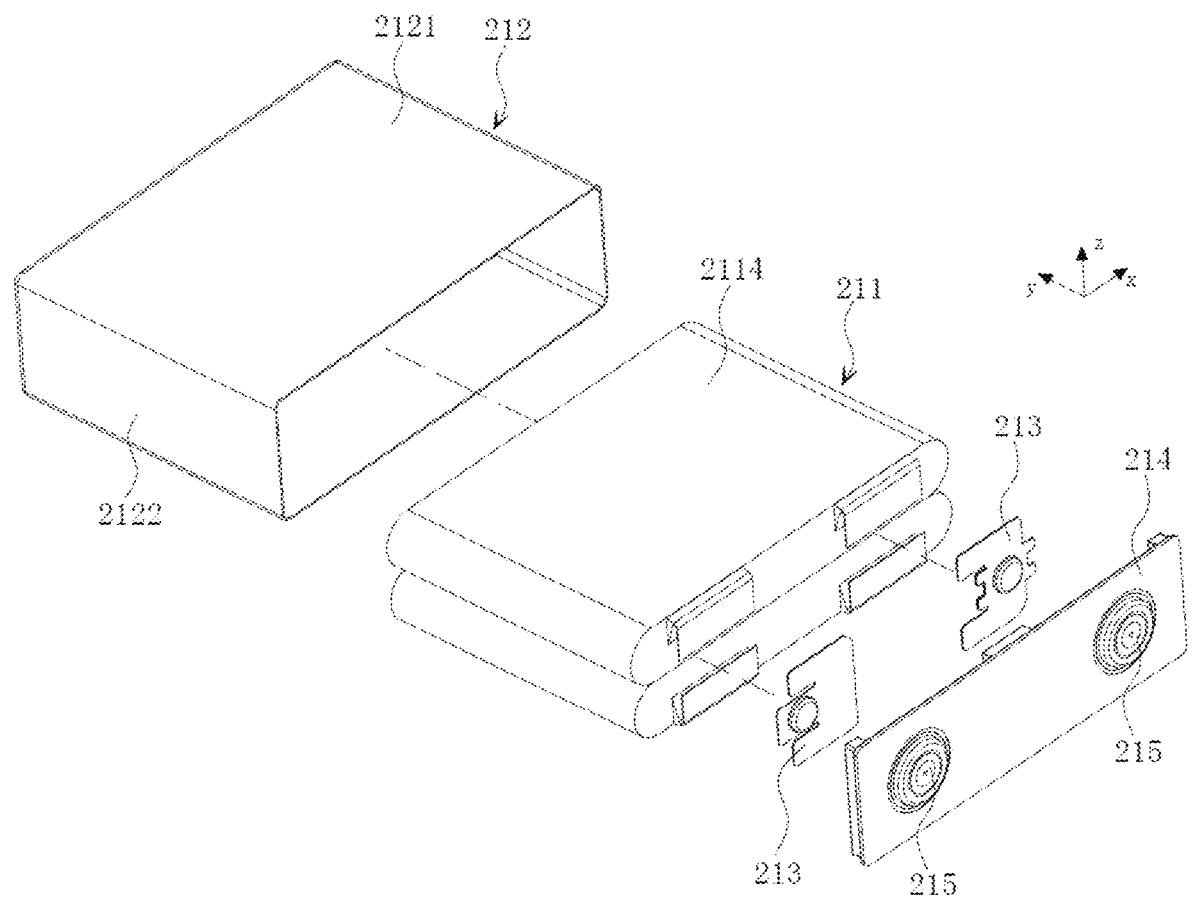
FIG. 5 is an exploded view of the battery cells, according to some embodiments of the present disclosure.

In some embodiments, as shown in FIGS. 4 and 5, battery module 2 can further include a strap 22 surrounding the periphery of battery cell array 20 and can include two long sides 221 and two short sides 222. Long sides 221 and first surfaces 2121 of battery cells 21 can face each there and extend along the horizontal direction (the direction indicated by arrow x). Short sides 222 and second surfaces 2122 of battery cells 21 can face each other and extend along the vertical direction (the direction indicated by arrow z). In some embodiments, battery modules 2 can be fixed with other means including, but not limited to compression strips, side panels and bolts.

In some embodiments, battery cell array 20 can be fixed by surrounding the periphery of battery cell array 20 with strap 22, which can have the benefit of light weight.

In some embodiments, battery module 2 can be provided with at least two strap 22. The two strap 22 can be arranged along the width direction (the direction indicated by arrow y) at an interval. In some embodiments, there can be only one strap 22.

As shown in FIG. 4, according to some embodiments of the present disclosure, battery cell array 20 can further include an insulating member 25, which can have a first surface and a second surface. The first surface can be located on the side of battery cell array 20 and the second surface can be located on the bottom of battery cell array 20, and one insulating member 25 can be disposed on each side of the bottom of battery cell array 20. Strap 22 encompasses the periphery of end plates 24, battery cells 21, and insulating members 25. Insulating members 25 not only can play the role of insulation protection but also prevent uneven force distribution when battery cells 21 are partially tightened by strap 22.

As shown in FIG. 4, according to some embodiments of the present disclosure, battery module 2 can further include two end plates 24 disposed on both ends of battery cell array 20 along the length direction (the direction indicated by arrow x). The strap 22 can encompass the periphery of the battery cell array 20 and the two end plates 24.

As shown in FIG. 5, according to some embodiments of the present disclosure, battery cell 21 can include electrode assemblies 211, a cell case 212, electrode terminal connectors 213, and a cover plate 214. Cell case 212 can be hexahedral or in other shape. Cell case 212 can have an inner space accommodating electrode assemblies 211 and electrolyte (not shown in the figure). In addition, cell case 212 can also have an opening. Electrode assemblies 211 can be contained in cell case 212. Cover plate 214 can cover the opening, and can be intended for enclosing electrode assemblies 211 inside cell case 212. Electrode assemblies 211 and electrode terminals 215 can be electrically connected by electrode terminal connectors 213. In some embodiments, there can be two electrode terminal connectors 213, which can be a positive terminal connector and a negative terminal connector, respectively. Cell case 212 may be made of materials including, but not limited to aluminum, aluminum alloy and plastic materials.

Figure 6:
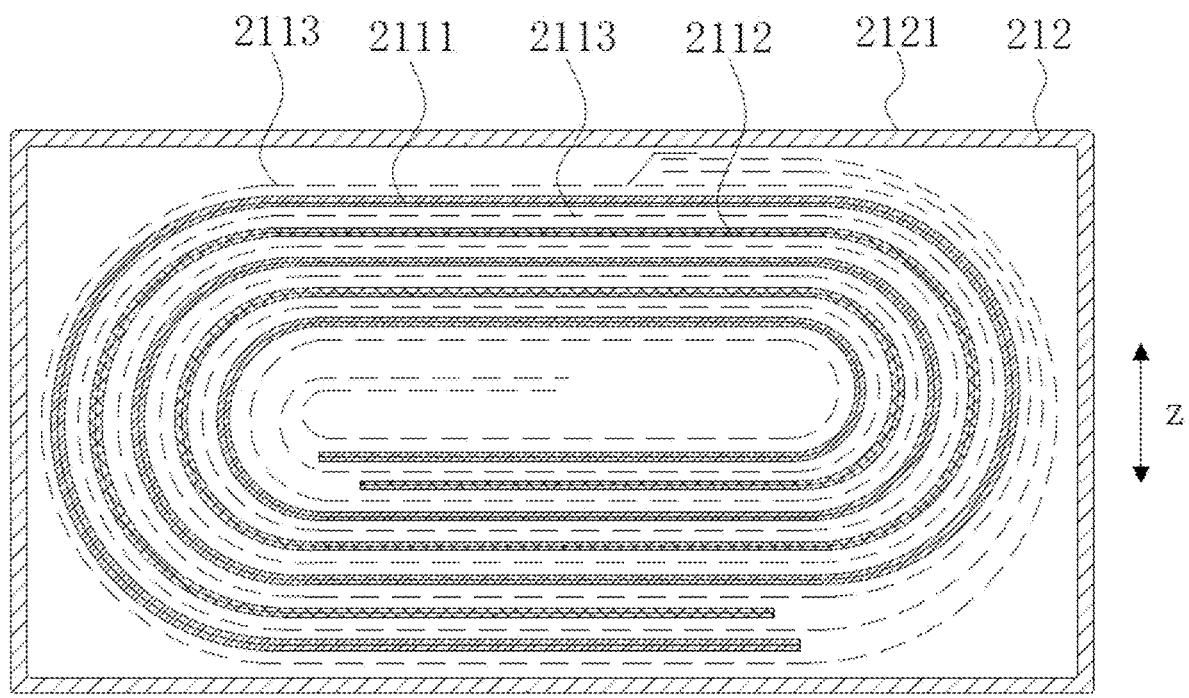
FIG. 6 is a cross-sectional view of wound electrode assemblies, according to some embodiments of the present disclosure.
Figure 7:
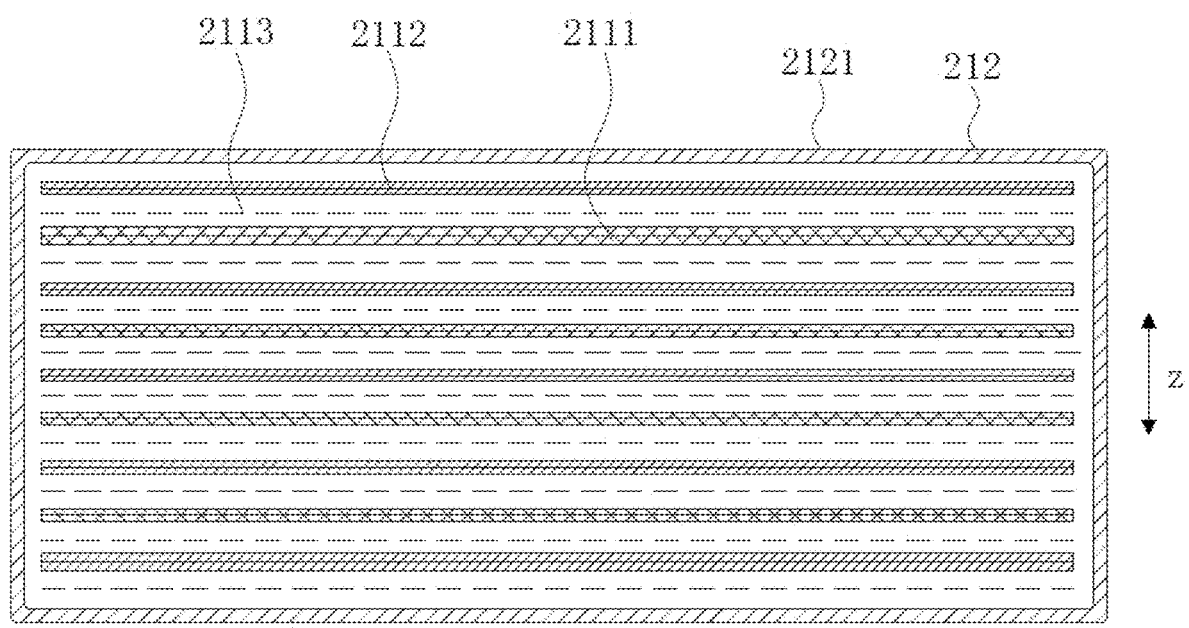
FIG. 7 is a cross-sectional view of laminated electrode assemblies, according to some embodiments of the present disclosure.

Electrode assemblies 211 can be contained in cell case 212, and can include a first electrode plate 2111, a second electrode plate 2112, and a separator 2113 disposed between first electrode plate 2111 and second electrode plate 2112. First electrode plate 2111 can be positive or negative, and second electrode plate 2112 can be negative or positive, corresponding to first electrode plate 2111. Separator 2113 can be an insulator disposed between first electrode plate 2111 and second electrode plate 2112. Electrode assemblies 211 may be in a wound configuration (as shown in FIG. 6) or a laminated configuration (as shown in FIG. 7).

In some embodiments, first electrode plate 2111 can be positive, while second electrode plate 2112 can be negative. Similarly, in some embodiments, first electrode plate 2111 can be negative while second electrode plate 2112 can be positive. Furthermore, the positive electrode active materials can be applied onto the coating area of the positive electrode plate, and the negative electrode active materials can be applied onto the coating area of the negative electrode plate. The uncoated area extending from the coating area can function as an electrode tab, and electrode assemblies 211 can include two electrode tabs, i.e. a positive electrode tab and a negative electrode tab, wherein the positive electrode tab can extend from the coating area of the positive electrode plate, while the negative electrode tab can extend from the coating area of the negative electrode plate. The positive electrode tab and the positive electrode terminal can be electrically connected by the positive terminal connector, while the negative electrode tab and the negative electrode terminal can be electrically connected by the negative terminal connector.

Cell case 212 can be substantially hexahedral, and can include two first surfaces 2121 and two second surfaces 2122, wherein the area of first surfaces 2121 can be larger than that of second surfaces 2122. In each battery cell array 20, the two second surfaces 2122 of each battery cell 21 can face each other along the horizontal direction (e.g., the length direction indicated by arrow x), while the two first surfaces 2121 can face each other along the vertical direction (the length direction indicated by arrow z).

In some embodiments, first surface 2121 of battery cell 21 facing upper cover 1 can be in direct contact with first bonding member 4 so as to establish an integral connection with upper cover 1 through first bonding member 4.

As shown in FIG. 6, according to some embodiments of the present disclosure, when electrode assemblies 211 are of a flat wound configuration, the outer surfaces of electrode assemblies 211 can include two flat sides 2114 facing each other along the vertical direction (the direction indicated by arrow z), i.e. flat sides 2114 and first surfaces 2121 can face each other. Electrode assemblies 211 can be substantially hexahedral, and flat sides 2114 can be substantially parallel to the winding axis and can be the largest outer surfaces. Flat sides 2114 can be a substantially flat surface, not necessarily a completely flat plane.

As shown in FIG. 7, according to some embodiments of the present disclosure, when electrode assemblies 211 are of a laminated configuration, first electrode plate 2111, separator 2113, and second electrode plate 2112 can be stacked along the vertical direction, i.e. the surface of first electrode plate 2111 and first surface 2121 can face each other.

Inevitably, electrode assemblies 211 will expand in the thickness direction of first electrode plate 2111 during charging and discharging process (in electrode assemblies 211 of a wound configuration, the expansion force is the largest in the direction perpendicular to flat side 2114; while in electrode assemblies 211 of a laminated configuration, the expansion force is the largest along the stacking direction of first electrode plate 2111 and second electrode plate 2112.).

In some embodiments, flat sides 2114 of wound electrode assemblies 211 can face the vertical direction (the direction indicated by arrow z). Or first electrode plates 2111 and second electrode plates 2112 of laminated electrode assemblies 211 can be stacked in the vertical direction (the direction indicated by arrow z). As a result, in both wound configuration and laminated configuration, the direction of the maximum expansion force exerted by electrode assemblies 211 on cell case 212 is vertical.

In the conventional battery pack design, in the battery cells of a battery module, the direction of the maximum expansion force exerted by the electrode assemblies on the cell case is horizontal. The dimension of the battery module along the horizontal direction is typically much larger than that along the vertical direction. This is because limited by the height of the vehicle chassis, it is required that more battery cells should be stacked along the horizontal direction, thus the expansion force accumulates. The battery module in the conventional design endures quite a large expansion force in the horizontal direction. As a result, very thick end plates are required on both sides of the battery module along the horizontal direction to resist the expansion force, resulting in the reduction of the energy density of the battery module. In the present disclosure, since the direction of the maximum expansion force exerted by electrode assemblies 211 on cell case 212 is vertical, and the number of battery cells 21 stacked along the vertical direction is small, the maximum expansion force of battery modules 2 can be greatly reduced compared with the conventional design.

In addition, since battery cells 21 generate gas inside cell case 212 during charging and discharging, the generated gas can impose a force on cell case 212, thereby exacerbating the outward expansion of cell case 212. Since the area of first surfaces 2121 can be larger than that of second surfaces 2122, and two first surfaces 2121 of battery cells 21 can face each other along the vertical direction, the direction of the maximum force exerted by the gases on cell case 212 can also be vertical, which further reduces the maximum expansion force of battery modules 2 compared to the conventional design.

In the present disclosure, since first bonding member 4 can be disposed between battery modules 2 and upper cover 1, and the direction of the maximum expansion force of battery modules 2 is vertical, battery modules 2 and bonding member 4 can be more closely fitted to prevent the first bonding member 4 from falling off during cell operation.

Figure 8:
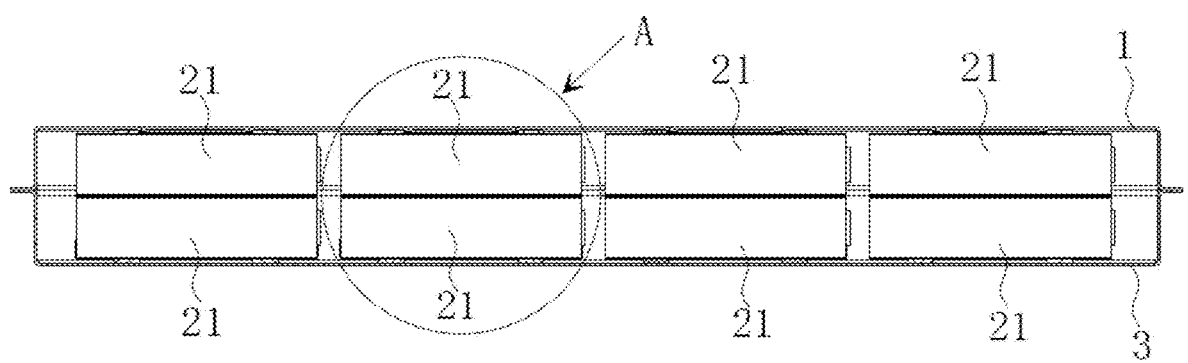
FIG. 8 is a sectional view of a battery pack, according to some embodiments of the present disclosure.
Figure 9:
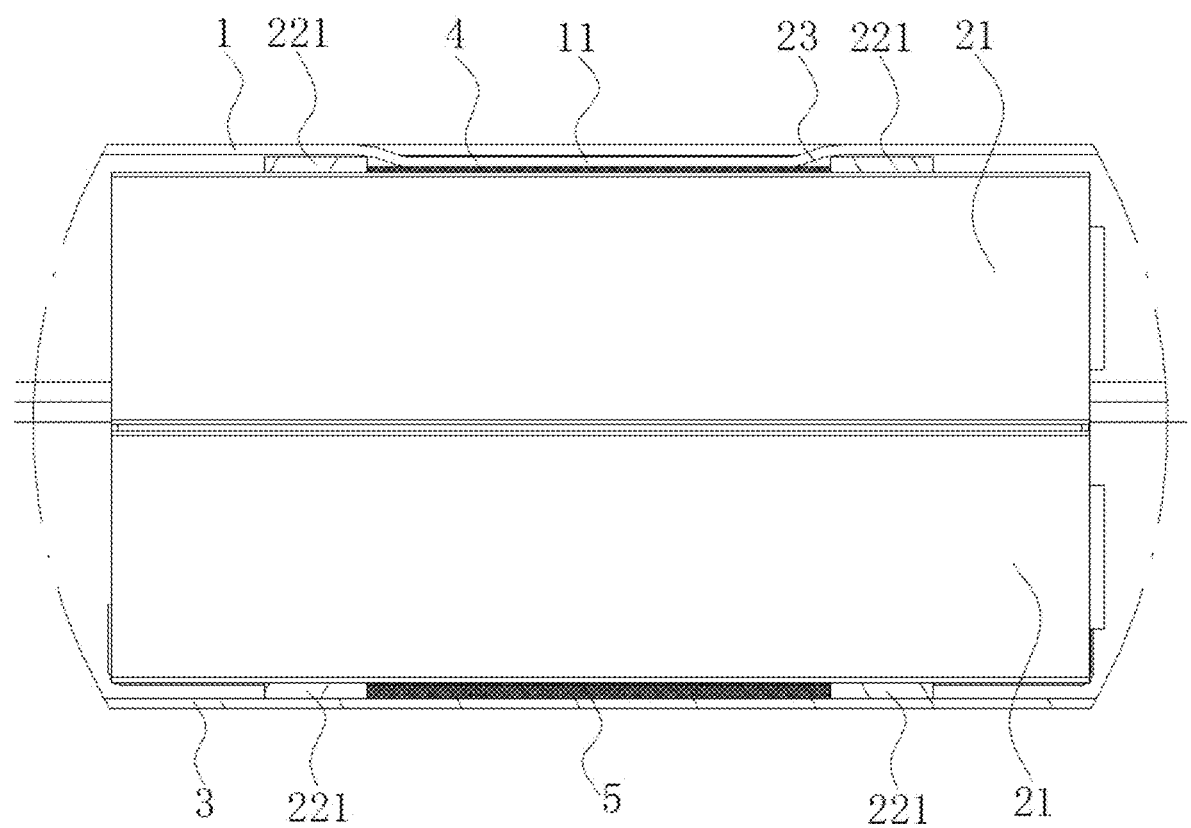
FIG. 9 is an enlarged view of A in FIG. 8, according to some embodiments of the present disclosure.

As shown in FIGS. 8 and 9, according to some embodiments of the present disclosure, a first groove 23 can be formed between two adjacent long sides 221 above first surface 2121, in which first bonding member 4 can be arranged and extends along the length direction (the direction indicated by arrow x). First bonding member 4 before solidification can be coated onto the upper surfaces of battery modules 2, and can be limited by two adjacent long sides 221 located above first surface 2121. In some embodiments, first bonding member 4 can be arranged in first groove 23 and can extend along the horizontal direction (the direction indicated by arrow x).

In some embodiments, a convex portion 11 disposed opposite to first groove 23 can be arranged on the inner surface of upper cover 1, and convex portion 11 can be bonded onto first bonding member 4 which can be a type of liquid or paste adhesive before solidification. In this situation, convex portion 11 arranged on the inner surface of upper cover 1 can, on the one hand, enhance the stiffness of upper cover 1 to resist the upward expansion force of battery modules 2, and on the other hand, reduce the consumption of first bonding member 4 which can be a type of liquid or paste adhesive before solidification. In some embodiments, there is no need to coat the entire upper surface of battery modules 2 with the adhesive.

In some embodiments, convex portion 11 can protrude into first groove 23, and the thickness of first bonding member 4 can be smaller than that of long sides 221. Since first bonding member 4 can be thinner than long sides 221, more space can be reserved to increase the thickness of convex portion 11, which can further enhance the stiffness of upper cover 1, and can further reduce the consumption of adhesive, such that the problem of adhesive overflowing is avoided.

In some embodiments, each battery module 2 can be provided with two straps 22, upper cover 1 can be provided with a plurality of convex portions 11 which can respectively correspond to first groove 23 in each battery module 2, and first bonding member 4 can be disposed in first groove 23. Therefore, the inner surface of upper cover 1 can be provided with a plurality of convex portions 11 respectively corresponding to the plurality of first bonding members 4 as shown in FIG. 1, further strengthening the connection between battery modules 2 and upper cover 1.

In some embodiments, the battery pack can further include a second bonding member 5 disposed on the lower surfaces of battery modules 2, by which the lower surfaces of battery modules 2 can be connected to lower case 3. Therefore, upper cover 1, battery modules 2, and lower case 3 can be integrated as a whole via first bonding member 4 and second bonding member 5 so as to prevent the relative vibration therebetween. In some embodiments, second bonding member 5 can be a type of structural adhesive.

In some embodiments, a second groove (not shown in the figure, which can be overlapped with second bonding member 5 in FIG. 9) can be formed between two adjacent long sides 221 below first surfaces 2121, in which second bonding member 5 can be arranged and extend along the horizontal direction (the direction indicated by arrow x). In this way, the consumption of second bonding member 5 is reduced, and the weight and cost are lowered accordingly.

Figure 10:
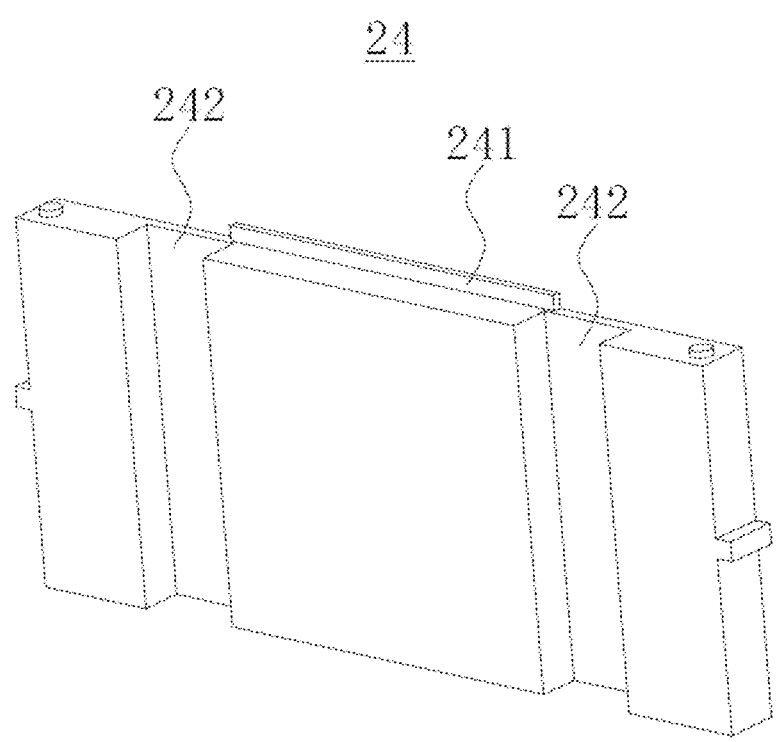
FIG. 10 is a structural diagram of an end plate, according to some embodiments of the present disclosure.

As shown in FIG. 10, according to some embodiments of the present disclosure, the top surface of end plate 24 can be provided with a protrusion 241 which can protrudes from the upper surfaces of the battery modules 2 and is located between two adjacent long sides 221. In this way, first groove 23 can be formed between two protrusions 241 on the two end plates 24 disposed on both ends of battery cell array 20 along the length direction and two adjacent long sides 221, in which first bonding member 4 can be arranged. Thus protrusions 241 can limit the unsolidified first bonding member 4 (e.g., first adhesive member 4 is in liquid state at this time) to prevent the loss of the first unsolidified bonding member.

In some embodiments, end plates 24 can also be provided with a strap limit slot 242, which can extend along the vertical direction and can be used for limiting the strap 22.

During the assembly, second surfaces 2122 of the plurality of battery cells 21 can be fitted to each other and stacked along the horizontal direction (e.g., the length direction indicated by arrow x) to form battery cell array 20. Two battery cell arrays can be stacked along the vertical direction (the direction indicated by arrow z) with two end plates 24 arranged at both ends. Two straps 22 can surround the periphery of battery cell arrays 20 and two end plates 24, forming a plurality of battery modules 2 stacked along the width direction (the direction indicated by arrow y). First bonding member 4 disposed between two straps 22 can be bonded onto convex portion 11 arranged on the inner surface of upper cover 1, battery modules 2 can be connected with upper cover 1 through the first bonding member, integrating the two as a whole, so as to prevent the battery pack from catching a fire or explosion in the vibration test.

It should be noted that, although the above embodiments have been described herein, the scope of the present disclosure is not limited thereby. Therefore, based on the innovative concept of the disclosure, modifications to the embodiments described herein, equivalent structural or process transformations based on the contents of the description and drawings of the disclosure, and direct or indirect application of the above-described technical solutions in other related technical fields are included in the scope of the disclosure.

While the disclosure has been described in connection with certain embodiments, it is to be understood that the disclosure is not to be limited to the disclosed embodiments but, on the contrary, is intended to cover various modifications and equivalent arrangements included within the spirit and scope of the disclosure, which scope is to be accorded the broadest interpretation so as to encompass all such modifications and equivalent structures as is permitted under the law.

What is claimed is:

1. A battery pack, comprising:
   (a) an enclosure comprising:
      a lower case; and
      an upper cover located above the lower case and in a sealed connection with the lower case;
   (b) a plurality of battery modules disposed inside the enclosure, each of the battery modules comprises a battery cell array and a strap surrounding a periphery of the battery cell array,
   wherein the battery cell array comprises a plurality of battery cells arranged along a horizontal direction and a plurality of busbars electrically connected with the plurality of battery cells, each of the battery cells comprising:
      a cell case comprising two first surfaces facing each other along a vertical direction and two second surfaces facing each other along the horizontal direction, wherein an area of each of the two first surfaces is larger than an area of each of the two second surfaces; and
      an electrode assembly contained in the cell case, the electrode assembly comprising:
         a first electrode plate;
         a second electrode plate; and
         a separator disposed between the first electrode plate and the second electrode plate,
         the electrode assembly having a flat wound configuration, in which outer surfaces of the electrode assembly comprise two flat sides facing each other along the vertical direction; or
         the electrode assemble having a laminated configuration, in which the first electrode plate, the separator and the second electrode plate are stacked along the vertical direction;
   wherein the strap comprises two long sides and two short sides, the two long sides face the two first surfaces and extend along the horizontal direction, and the two short sides face the two second surfaces and extend along the vertical direction; and
   (c) a first bonding member disposed on an upper surface of the battery modules connecting the battery modules with the upper cover,
   wherein a first groove is formed between two adjacent long sides above one of the two first surfaces that faces the upper cover, and the first bonding member is disposed inside the first groove and extends along the horizontal direction.

2. The battery pack according to claim 1, wherein the plurality of battery cells are connected with the upper cover via the first bonding member, and one of the two first surfaces faces the upper cover and is in a direct contact with the first bonding member.

3. The battery pack according to claim 1, wherein each of the plurality of battery modules comprises two battery cell arrays stacked along the vertical direction.

4. The battery pack according to claim 1, wherein each of the plurality of battery modules comprises two straps arranged at an interval.

5. The battery pack according to claim 1, wherein a convex portion disposed opposite to the first groove and bonded with the first bonding member is formed in an inner surface of the upper cover.

6. The battery pack according to claim 5, wherein the convex portion extends into the first groove, and a thickness of the first bonding member is smaller than a thickness of the two adjacent long sides above the one of the two first surfaces facing the upper cover.

7. The battery pack according to claim 4, wherein the battery pack comprises a second bonding member disposed on a lower surface of one of the plurality of battery modules, and the lower surface of the one of the plurality of battery modules is connected with the lower case through the second bonding member.

8. The battery pack according to claim 7, wherein a second groove is formed between two adjacent long sides below one of the two first surfaces away from the upper cover, and the second bonding member is disposed within the second groove and extends along the horizontal direction.

9. The battery pack according to claim 1, wherein each of the plurality of battery modules comprises two end plates respectively disposed at two ends of the battery cell array along the horizontal direction, the strap surrounds a periphery of the battery cell array and the two end plates, and a top surface of each of the two end plates is provided with a protrusion protruding out of an upper surface of the battery module and located between the two adjacent long sides above the one of the two first surfaces facing the upper cover.

10. The battery pack according to claim 5, wherein each of the plurality of battery modules is provided with two straps, and a plurality of convex portions respectively corresponding to the first groove of each of the plurality of battery modules are formed in the upper cover.

\* \* \* \* \*